United States Patent
Ward et al.

(10) Patent No.: US 7,913,443 B2
(45) Date of Patent: Mar. 29, 2011

(54) AUDIBLE FISHING WEIGHT

(76) Inventors: David P. Ward, Dallas, TX (US); Phillip C. Ward, Wasila, AK (US)

( * ) Notice: Subject to any disclaimer, the term of this patent is extended or adjusted under 35 U.S.C. 154(b) by 0 days.

(21) Appl. No.: 12/488,028

(22) Filed: Jun. 19, 2009

(65) Prior Publication Data

US 2010/0319237 A1    Dec. 23, 2010

(51) Int. Cl.
*A01K 95/00*    (2006.01)
(52) U.S. Cl. ...................... 43/42.31; 43/44.93
(58) Field of Classification Search .............. 43/42.31, 43/44.87, 44.91, 44.92, 44.93
See application file for complete search history.

(56) References Cited

U.S. PATENT DOCUMENTS

| | | | | |
|---|---|---|---|---|
| 2,065,854 | A * | 12/1936 | Edel et al. | 43/44.92 |
| 2,737,749 | A * | 3/1956 | Trout | 43/42.31 |
| 2,977,705 | A * | 4/1961 | Busnel | 43/17.1 |
| 3,848,353 | A * | 11/1974 | McClellan | 43/42.31 |
| 4,008,539 | A * | 2/1977 | Gardner | 43/42.31 |
| 5,144,765 | A * | 9/1992 | Keeton | 43/42.31 |
| 5,259,151 | A * | 11/1993 | Wicht | 43/42.31 |
| 5,381,622 | A * | 1/1995 | Tregre | 43/42.31 |
| 5,428,919 | A * | 7/1995 | Enomoto | 43/42.31 |
| 5,661,922 | A * | 9/1997 | Bonomo | 43/42.31 |
| 6,006,464 | A * | 12/1999 | Tregre | 43/42.31 |
| 6,199,313 | B1 * | 3/2001 | Moore | 43/42.31 |
| 2001/0047609 | A1 * | 12/2001 | Orgeron et al. | 43/42.31 |
| 2008/0256840 | A1 * | 10/2008 | Rodriguez | 43/42.31 |

* cited by examiner

*Primary Examiner* — David J Parsley
(74) *Attorney, Agent, or Firm* — Daniel V. Thompson

(57) ABSTRACT

An audible fishing weight has a striker is constrained for reciprocating linear motion relative to at least one anvil face between upper and lower limits of the motion. The striker and anvil face are adapted and arranged to produce fish-attractive sound when the striker contacts the anvil face at the lower limit of the striker linear motion with respect to the anvil face.

6 Claims, 6 Drawing Sheets

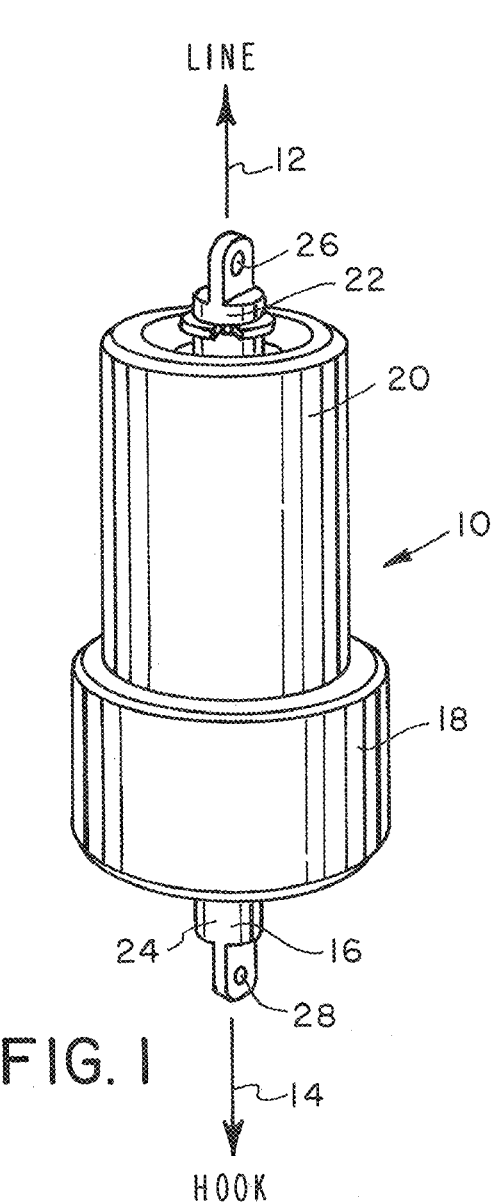
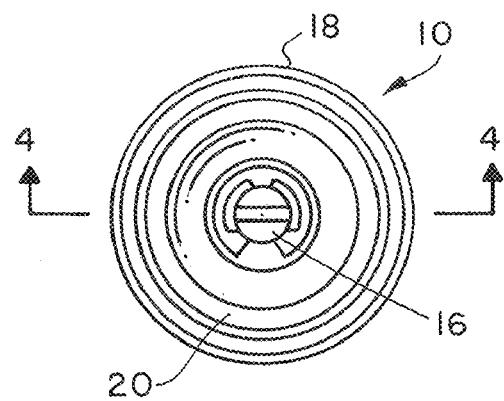
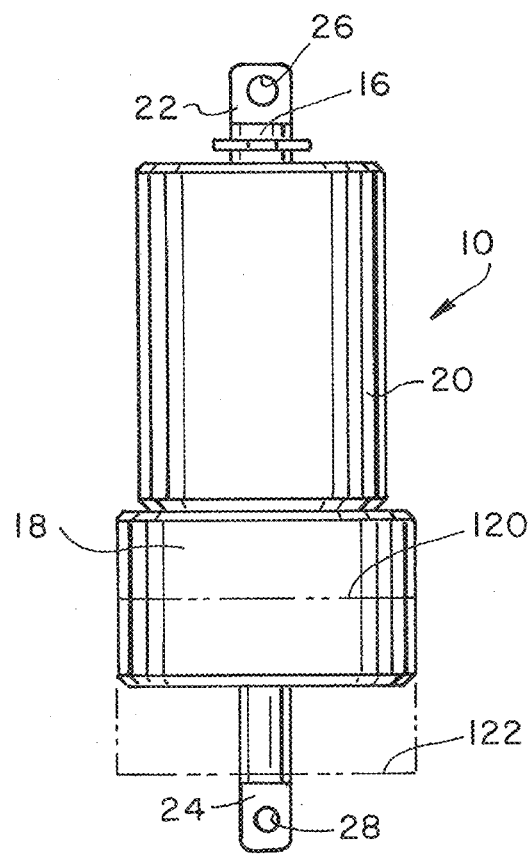

AUDIBLE FISHING WEIGHT

BACKGROUND OF THE INVENTION

The present invention relates in general to fishing equipment. More specifically, but without restriction to the particular use which is shown and described, this invention relates to a fishing weight that produces fish-attractive sounds.

It has been found that certain sea fish such as Alaskan halibut are attracted to metallic clicking sounds emanating from a location near the hook and bait. It is therefore desirable to incorporate a sound-making structure in a fishing weight located near the hook.

SUMMARY OF THE INVENTION

A fishing weight incorporates a striker and anvil that contact each other in response to fishing line motion to produce fish-attractive sounds. The striker and anvil are formed of metal, preferably stainless steel.

BRIEF DESCRIPTION OF THE DRAWINGS

A more complete understanding of the invention and its advantages will be apparent from the Detailed Description taken in conjunction with the accompanying Drawings, in which:

FIG. 1 is a perspective view of a first embodiment of the Audible Fishing Weight of the present invention;

FIG. 2 is a top view of the Audible Fishing Weight of FIG. 1;

FIG. 3 is a side view of the Audible Fishing Weight of FIG. 1;

DETAILED DESCRIPTION

Figure 4:
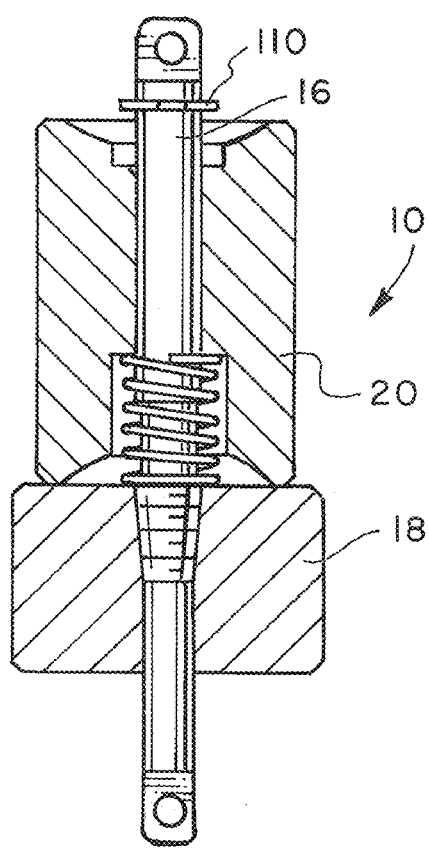
FIG. 4 is a sectional view of the Audible Fishing Weight of FIG. 1 taken along lines 4-4 of FIG. 2.

Referring initially to FIGS. 1-6, where like numerals refer to like and corresponding parts, a first embodiment of the audible fishing weight 10 is adapted to be interposed between a line designated by arrow 12 and hook designated by arrow 14. The weight 10 is composed of three major components, stem 16, anvil 18 and striker 20.

Stem 16 has a top end 22 and a bottom end 24. The stem 16 has walls defining apertures 26 and 28 for connection to the fishing line at the top end 22 and for connection to a hook at the bottom end 24, respectively.

Stem 16 also has walls defining a retaining ring groove 30 (FIG. 6) adjacent the top end 22. Stem 16 has a cylindrical bearing section 32 below the retaining ring groove 30. A cylindrical spring relief section 34 is located below the bearing section 32. Spring relief section 34 has a diameter dimension smaller than the diameter dimension of the bearing section 32. The stem 16 also has a male tapered threaded section 36 located below the spring relief section 34. The threaded section 38 is tapered to a smaller cross-sectional dimension at a lower end 40 of the threaded section 38. Finally, the stem has an extension section 42 below the threaded section 38 and above the bottom end 24.

The next major component to be described is the anvil 18 connected to the stem 16. It will be understood that stem 16 and anvil 18 could be formed from one continuous piece of material rather than as separate components, with substantially equivalent function but loss of adjustability of the weight as described below.

The anvil 18 is a cylindrical body with an outer wall 50, an upper planar face 52, a lower planar face 54 and a central passageway 56. The anvil central passageway 56 has a female tapered threaded section 58 engaged with the threaded section 38 of the stem 16. Passageway 56 includes an internal cylindrical section 60 located below the threaded section 58 and engaged with the extension section 42 of the stem 16.

The striker 20 is a cylindrical body with an outer wall 70, an upper face 72, a lower face 74 and a central passageway 76. The striker outer wall 70 has an external diameter dimension smaller than an external diameter dimension of the anvil outer wall 50.

The lower face 74 of the striker has a chamfer wall 78 extending from the outer wall 70 to a planar annular wall 80. Annular wall 80 extends to an inwardly-concave wall 82, and the inwardly-concave wall 82 extends to a cylindrical spring recess section 84 of the striker central passageway 76.

The spring recess section 84 of the striker central passageway 76 extends to a planar spring recess end wall 86. The spring recess end wall 86 extends to an internal cylindrical bearing wall 88 of the striker central passageway 76. The bearing wall 88 extends to a retaining ring recess section 90 of the striker central passageway 76.

The upper face 72 of the striker 20 has a chamfer wall 92 extending from the outer wall 70 to a planar annular wall 94. The annular wall 94 extends to an inwardly-concave wall 96. Inwardly-concave wall 96 extends to the retaining ring recess section 90 of the striker central passageway 76.

The bearing wall 88 of the striker central passageway 76 has a diameter dimension sized slightly more largely than the diameter dimension of the stem bearing section 32 to constrain the striker 20 for reciprocating linear motion of the striker relative to the stem 16 and anvil 18. The annular wall 80 of the striker lower face 74 is parallel to the anvil upper face 52 for full-contact striking impact of the striker lower face annular wall 80 and the anvil upper face 52 when the striker 20 is at the lower limit of its linear motion with respect to the anvil 18 and stem 16, as best shown in FIG. 4.

Figure 5:
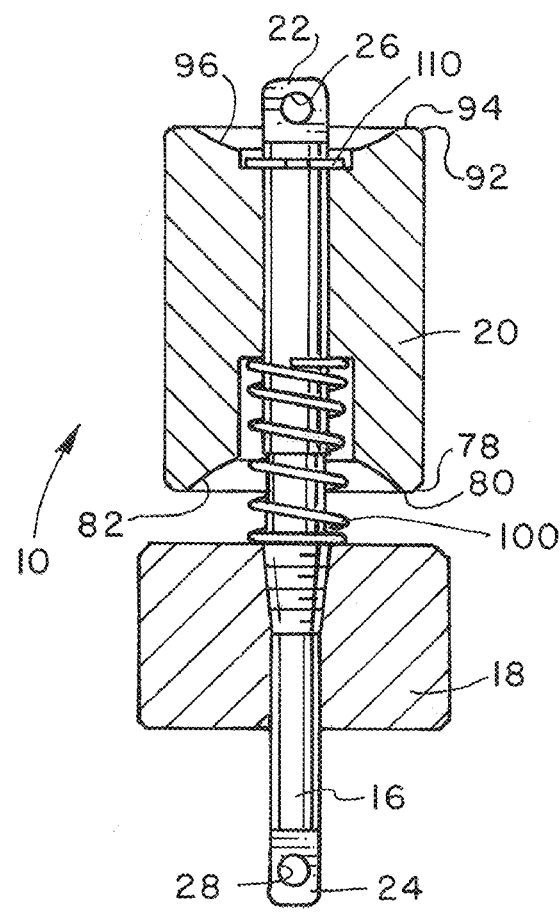
FIG. 5 is a view similar to FIG. 4 with the striker at the upper limit of its travel with respect to the anvil.
Figure 6:
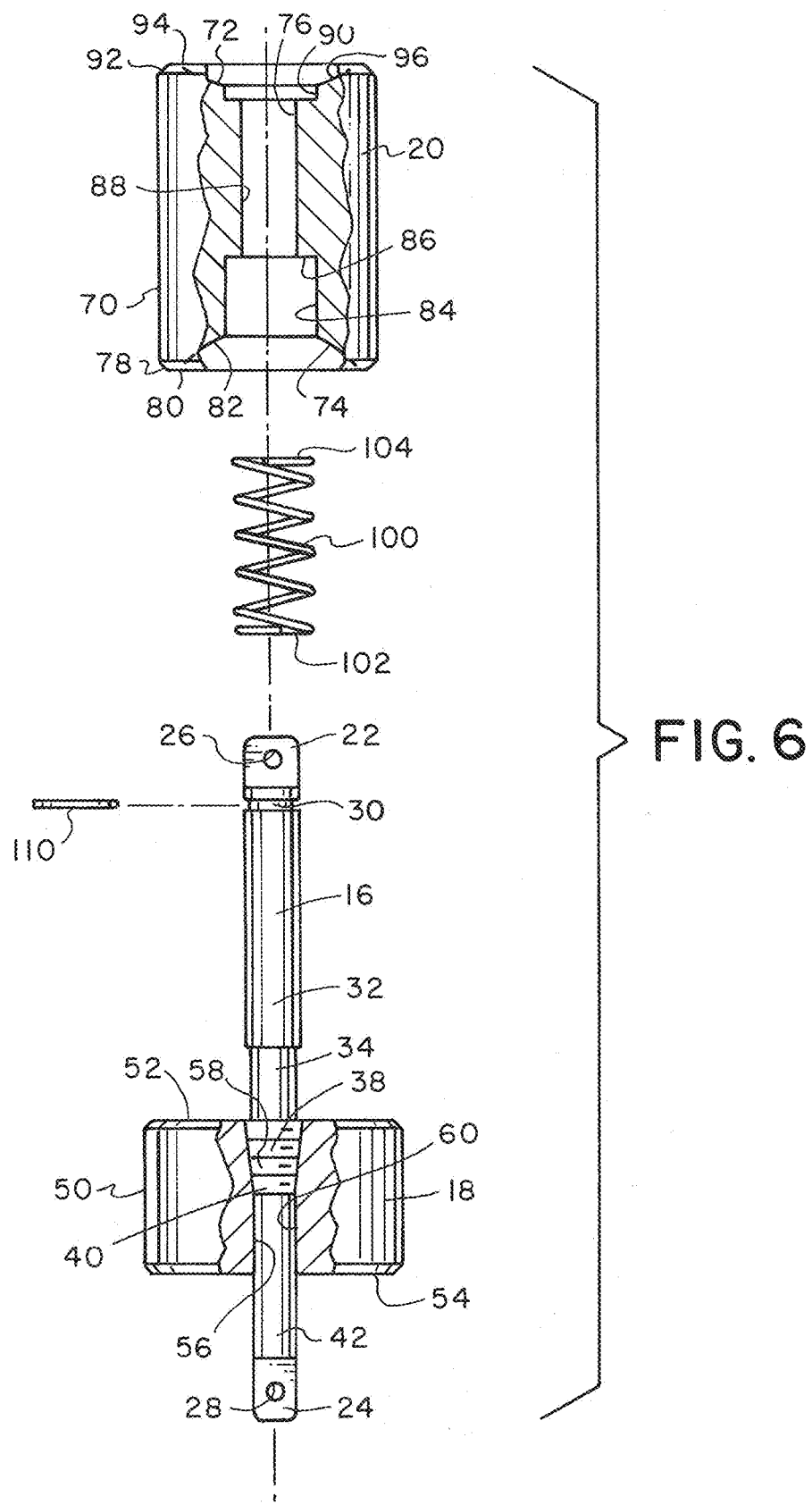
FIG. 6 is an exploded view of the Audible Fishing Weight of FIG. 1.
Figure 7:
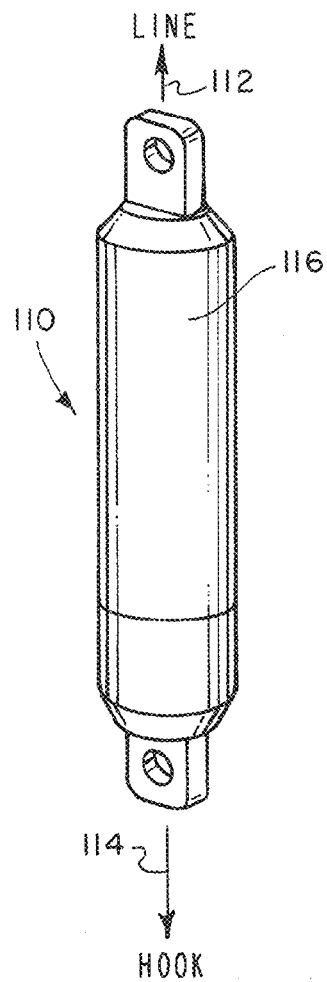
FIG. 7 is a perspective view of a second embodiment of the Audible Fishing Weight of the present invention.
Figure 8:
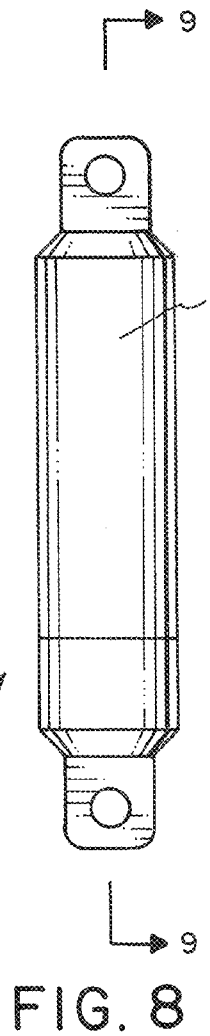
FIG. 8 is a side view of the Audible Fishing Weight of FIG. 7.

A coil spring 100 has a lower end 102 in contact with the anvil upper face 52. Spring upper end 104 is in contact with the spring recess end wall 86 of the striker central passageway 76, as best shown in FIGS. 4 and 5. The coil spring 100 has a length dimension such that the spring 100 is compressed when the striker 20 is at the lower limit of its linear motion with respect to the anvil 18 and stem 16, to urge the striker 20 away from the anvil 18. The spring 100 has a spring rate permitting upward motion of the anvil 18 and stem 16 by the fishing line to overcome the force of the spring 100 and allow contact of the striker 20 and anvil 18. The weights of components 16, 18 and 20 and the spring 100 length and rate are all interdependent to achieve the noise-making function and may be determined by reasonable experimentation in a swimming pool or the like.

An E-clip retaining ring 110 is engaged with the stem retaining ring groove 30. Retaining ring 110 has an outer dimension sized to fit within and contact the retaining ring recess section 90 of the striker central passageway 76 when the striker 20 is the upper limit of its linear motion with respect to the anvil 18 and stem 16, as best shown in FIG. 5.

In operation, the striker 20 and anvil 16 are adapted and arranged to produce fish-attractive sound when the striker 20 contacts the anvil 18 at the lower limit of the striker 20 linear motion with respect to the anvil 18 and stem 16. Lowering and raising of the fishing line will impart the desired motion of the striker 20. The concave wall 96 at the upper end of the striker 20 acts as a catch area to increase the drag in the water, forcing the striker down. The chamfer wall 78 and concave wall 82 at the bottom end of striker 20 enable a thin annular wall 80 in the sound-producing region, which enhances the noise-making and fish-attractive function of the device.

An optional feature of the device is provided by extension section 42 of stem 16 and the threaded connection between the anvil 18 and stem 16. The extension section 42 extends through and below the anvil 18, such that anvils 18 of varied lengths and weights to be interchanged by disengagement and engagement of the anvils 18 and stem 16. This is best shown in FIG. 3, where the anvil 18 is of a medium weight, but could be thinner as shown by dashed line 120 representing the bottom of a thinner anvil, or thicker as shown by dashed line 122 representing the extended sides and bottom of a thicker anvil. The tapered thread connection allows anvils to be unscrewed and screwed tightly on the stem by hand.

All parts of fishing weight 10, including the stem 16, anvil 18, striker 20, spring 100 and retaining ring 110, should be formed of stainless steel.

Referring now to FIGS. 7-12, where like numerals indicate like and corresponding elements, the second embodiment of the audible fishing weight 110 is adapted to be interposed between a line designated by arrow 112 and hook designated by arrow 114. The weight 110 is composed of two major components, body 116 and striker 118.

Body 116 has a top end 120 and a bottom end 122. Body 116 has walls 124, 126 defining apertures for connection to the fishing line 112 at the top end 120 and for connection to the hook 114 at the bottom end 122.

The top end 120 has a cylindrical lower section 128 with a circular upper anvil wall 130 and an upper cylindrical wall 132. The lower end 122 of the body has a circular medial anvil wall 134, a lower cylindrical wall 136 (FIG. 12), and a circular lower wall 138.

The upper and lower ends 120, 122 of the body are removably joined by a threaded connection 140, with the circular upper anvil wall 130, the upper cylindrical wall 132, the circular medial anvil wall 134, the lower cylindrical wall 136, and the circular lower wall 138 defining a cavity 142.

Figure 9:
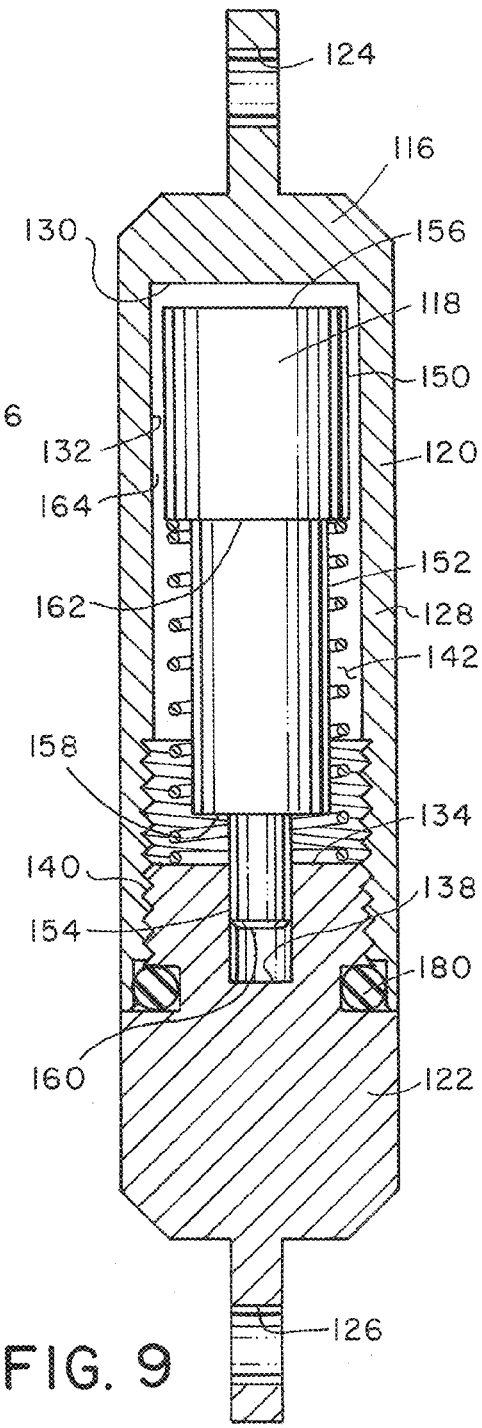
FIG. 9 is a sectional view of the Audible Fishing Weight of FIG. 7 taken along lines 9-9 of FIG. 8.

Striker 118 is located within the cavity 142, with the striker 118 being a cylindrical body with upper, medial and lower outer cylindrical walls 150, 152, 154, upper, medial and lower faces 156, 158, 160 and spring relief face 162. The striker upper outer wall 150 has an external diameter dimension smaller than an internal diameter dimension of the upper cylindrical wall 132 of the cavity to form an annular space 164 (FIG. 9). The striker medial outer wall 152 has an external diameter dimension smaller than the striker upper outer wall 150 external diameter dimension, and the striker lower outer wall 154 has an external diameter dimension smaller than the striker medial outer wall 152 external diameter dimension.

The striker upper outer wall 150 is joined to the striker upper face 156 and the striker spring relief face 162, the striker medial wall 152 is joined to the striker spring relief face 162 and the striker medial face 158, and the striker lower outer wall 154 is joined to the striker medial face 158 and the striker lower face 160.

The striker lower outer wall 154 is adapted, arranged and engaged with the lower cylindrical wall 136 of the body lower end to enable slidable linear movement of the striker 118 with respect to the body 116.

Figures 10, 11:
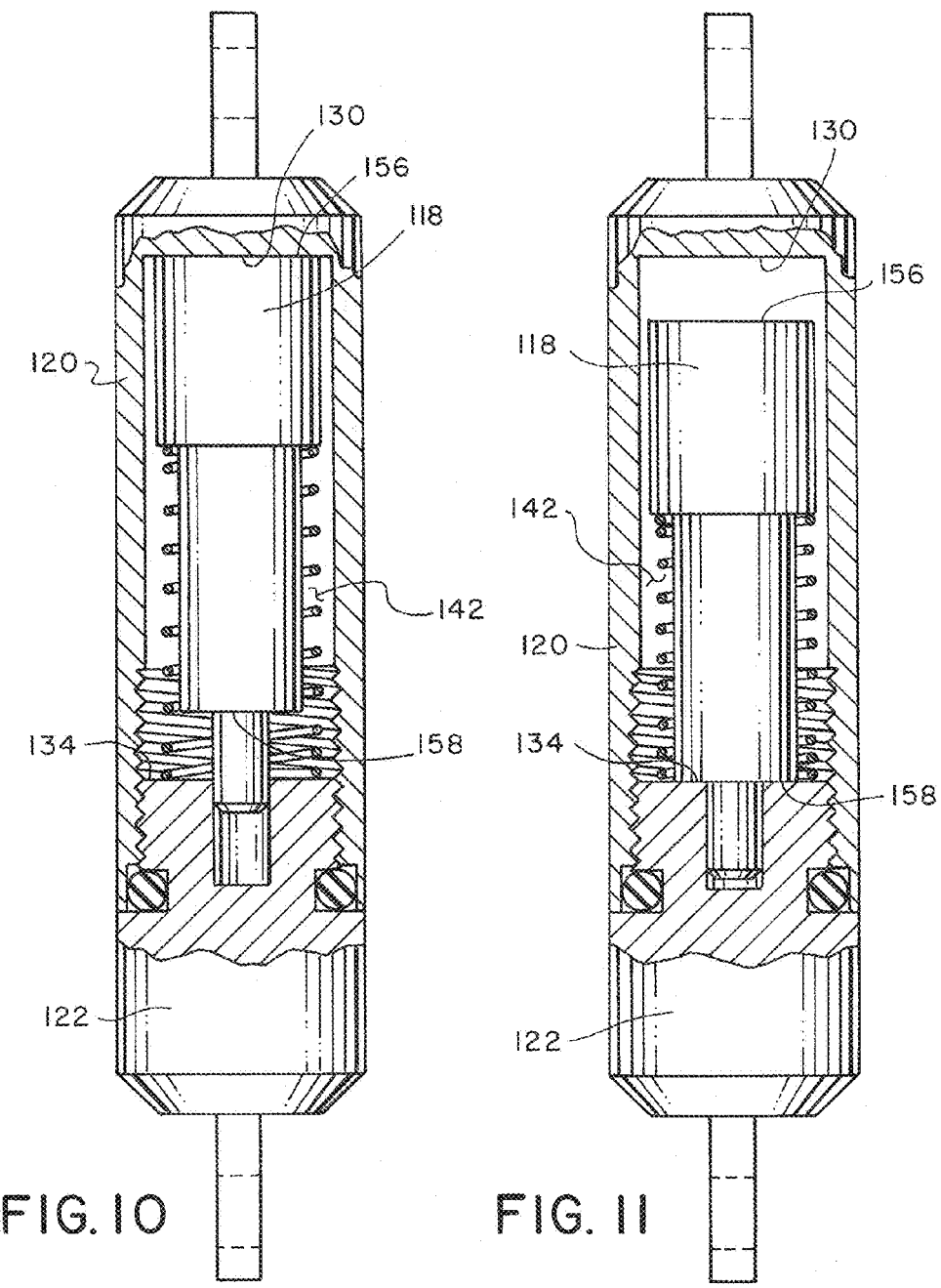
FIG. 10 is a partially broken away side view of the Audible Fishing Weight of FIG. 7 with the striker at the upper limit of it travel with respect to the anvil.
FIG. 11 is a view similar to FIG. 10 with the striker at the lower limit of its travel with respect to the anvil.
Figure 12:
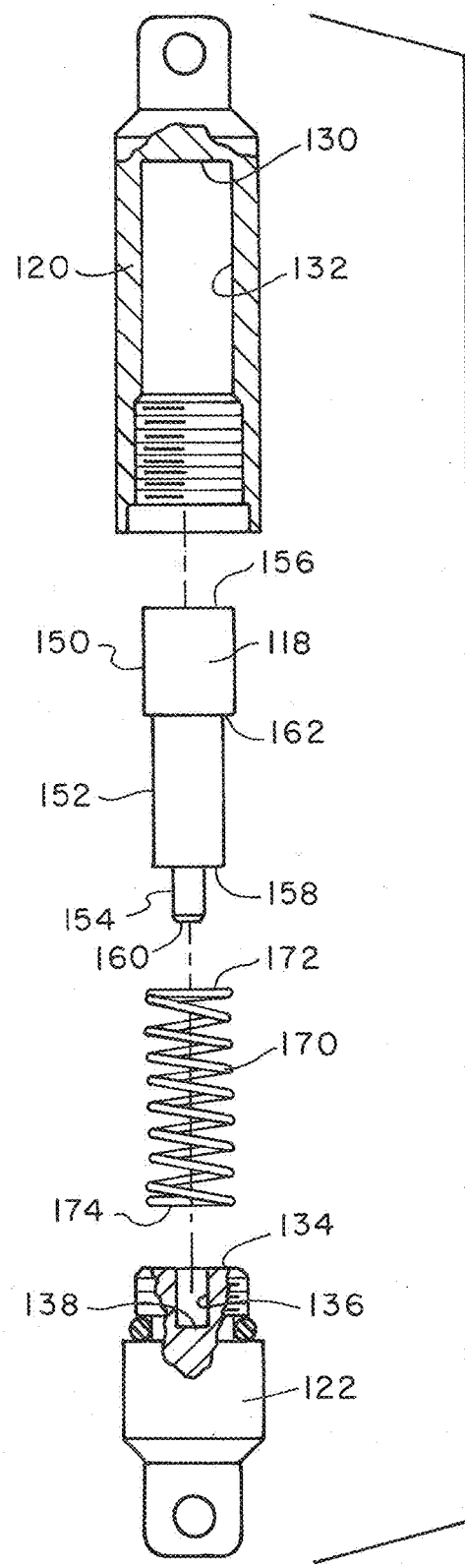
FIG. 12 is an exploded view of the Audible Fishing Weight of FIG. 7.

A coil spring 170 (FIG. 12) has an upper end 172 in contact with the striker spring relief face 162, and a lower end 174 in contact with the body lower end medial anvil wall 134. The spring 170 has a length and spring rate permitting downward motion of the striker 118 by the fishing line 112 to allow contact of the striker upper face 156 with the body upper anvil wall 130, and permitting upward motion of the striker 118 by the fishing line 112 to overcome the force of the spring and allow contact of the striker medial face 158 with the body medial anvil wall 134. The striker 118 and body 116 are adapted and arranged to produce fish-attractive sounds when the striker faces 156, 158 contact the body anvil walls 130, 134 at the upper and lower limits of the striker 118 linear motion with respect to the body 116, as best shown in FIGS. 10 and 11.

An O-ring 180 is located between the upper and lower ends 120, 122 of the body for sealing the cavity 142.

It will be understood that each of the elements described above, or two or more together, may also find a useful application in other types of constructions differing from the type described above.

While the invention has been illustrated and described as embodied in a particular fishing weight, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:
1. An audible fishing weight, comprising:
a stem having an aperture at an upper end for connection to a fishing line;
the stem connected to an anvil;
a striker constrained for reciprocating linear motion relative to the anvil and stem between upper and lower limits of the motion;
the striker and anvil adapted and arranged to produce fish-attractive sound when the striker contacts the anvil at the lower limit of the striker linear motion with respect to the anvil and stem;
with the anvil having an upper planar face and the striker having a lower face with a planar annular wall, the annular wall of the striker lower face being parallel to the anvil upper face for full-contact striking impact of the striker lower face annular wall and the anvil upper face when the striker is at the lower limit of its linear motion with respect to the anvil and stem;
with a spring located between the striker and the anvil to urge the striker away from the anvil, the spring having a spring rate permitting motion of the anvil and stem by the fishing line to overcome the force of the spring and allow contact of the striker and anvil;

with the anvil and striker being cylindrical bodies, with the anvil and striker having outer cylindrical walls, and with the striker outer wall having an external diameter dimension smaller than an external diameter dimension of the anvil outer wall;

with the striker having an upper face and a central passageway;

the lower face of the striker having a chamfer wall extending from the outer wall of the striker to the annular wall, the annular wall extending to an inwardly-concave wall, and the inwardly-concave wall extending to a cylindrical spring recess section of the striker central passageway;

the spring recess section of the striker central passageway extending to a planar spring recess end wall; the spring recess end wall extending to an internal cylindrical bearing wall of the striker central passageway, and the bearing wall extending to a retaining ring recess section of the striker central passageway; and the upper face of the striker having a chamfer wall extending from the outer wall of the striker to an upper planar annular wall, the upper planar annular wall extending to an upper inwardly-concave wall, and the upper inwardly-concave wall extending to the retaining ring recess section of the striker central passageway.

2. The audible fishing weight of claim 1, with the anvil having a lower planar face and a central passageway; and the anvil central passageway including a female tapered threaded section engaged with a male tapered threaded section of the stem, and the passageway including an internal cylindrical section located below the threaded section and engaged with an extension section of the stem.

3. The audible fishing weight of claim 2 with the stem extension section extending below the anvil, the extension section being adapted and arranged to permit anvils of varied lengths and weights to be interchanged by disengagement and engagement of the threads of the anvils and stem.

4. An audible fishing weight, comprising:

a stem having a top end and a bottom end;

the stem having walls defining apertures for connection to a fishing line at the top end and for connection to a hook at the bottom end;

the stem having walls defining a retaining ring groove adjacent the top end;

the stem having a cylindrical bearing section below the retaining ring groove, the bearing section having a diameter dimension;

the stem having a cylindrical spring relief section below the bearing section, the spring relief section having a diameter dimension smaller than the diameter dimension of the bearing section;

the stem having a male tapered threaded section below the spring relief section, the threaded section being tapered to a smaller cross-sectional dimension at a lower end of the threaded section;

the stem having an extension section below the threaded section and above the bottom end;

an anvil connected to the stem;

the anvil being a cylindrical body with an outer wall, an upper planar face, a lower planar face and a central passageway;

the anvil central passageway including a female tapered threaded section engaged with the threaded section of the stem, and the passageway including an internal cylindrical section located below the threaded section and engaged with the extension section of the stem;

a striker being a cylindrical body with an outer wall, an upper face, a lower face and a central passageway;

the striker outer wall having an external diameter dimension smaller than an external diameter dimension of the anvil outer wall;

the lower face of the striker having a chamfer wall extending from the outer wall of the striker to a planar annular wall, the annular wall extending to an inwardly-concave wall, and the inwardly-concave wall extending to a cylindrical spring recess section of the striker central passageway;

the spring recess section of the striker central passageway extending to a planar spring recess end wall; the spring recess end wall extending to an internal cylindrical bearing wall of the striker central passageway, and the bearing wall extending to a retaining ring recess section of the striker central passageway;

the upper face of the striker having a chamfer wall extending from the outer wall of the striker to an upper planar annular wall, the upper planar annular wall extending to an upper inwardly-concave wall, and the upper inwardly-concave wall extending to the retaining ring recess section of the striker central passageway;

the bearing wall of the striker central passageway having a diameter dimension sized with respect to a diameter dimension of the stem bearing section to constrain the striker for reciprocating linear motion of the striker relative to the stem and anvil;

the annular wall of the striker lower face being parallel to the anvil upper face for full-contact striking impact of the striker lower face annular wall and the anvil upper face when the striker is at a lower limit of its linear motion with respect to the anvil and stem;

a coil spring having a lower end in contact with the anvil upper face, an upper end in contact with the spring recess end wall of the striker central passageway, the coil spring having a length dimension such that the spring is compressed when the striker is at the lower limit of its linear motion with respect to the anvil and stem to urge the striker away from the anvil;

the spring having a spring rate permitting motion of the anvil and stem by the fishing line to overcome the force of the spring and allow contact of the striker and anvil;

an E-clip retaining ring engaged with the stem retaining ring groove, the retaining ring having an outer dimension sized to fit within and contact the retaining ring recess section of the striker central passageway when the striker is at an upper limit of its linear motion with respect to the anvil and stem; and the striker and anvil being adapted and arranged to produce fish-attractive sound when the striker contacts the anvil at the lower limit of the striker linear motion with respect to the anvil and stem.

5. The audible fishing weight of claim 4 with the stem having an extension section extending below the anvil, the extension section being adapted and arranged to permit anvils of varied lengths and weights to be interchanged by disengagement and engagement of the anvils and stem.

6. The audible fishing weight of claim 4 with the stem, anvil, striker, spring and retaining ring being formed of stainless steel.

* * * * *